United States Patent [19]

Jenkines et al.

[11] 4,296,159

[45] Oct. 20, 1981

[54] POLYURETHANE BACKED CARPET

[75] Inventors: Randall C. Jenkines; Clyde G. Taylor; Robert B. Turner; Donald H. Ridgway, all of Lake Jackson, Tex.

[73] Assignee: The Dow Chemical Company, Midland, Mich.

[21] Appl. No.: 191,590

[22] Filed: Sep. 29, 1980

[51] Int. Cl.$^3$ .......................... B32B 3/00; B32B 3/26
[52] U.S. Cl. ..................... 428/95; 428/315; 521/86; 521/88; 521/111
[58] Field of Search .............. 428/95, 315; 521/86, 521/88, 111, 904, 906, 907, 914, 921

[56] References Cited

U.S. PATENT DOCUMENTS

| | | | |
|---|---|---|---|
| 3,402,192 | 9/1968 | Haluska | 521/88 |
| 3,518,288 | 6/1970 | Haluska | 521/86 |
| 3,519,526 | 7/1970 | Carey | 428/95 |
| 3,637,541 | 1/1972 | Reamy | 521/86 |
| 3,664,863 | 5/1972 | Brotherton | 428/95 |
| 3,706,681 | 12/1972 | Bechura | 521/86 |
| 3,730,822 | 5/1973 | Lovell | 428/95 |
| 3,755,212 | 8/1973 | Dunlap | 521/88 |
| 3,772,224 | 11/1973 | Marlin | 521/86 |
| 3,821,067 | 6/1974 | Taylor | 428/95 |
| 3,821,130 | 6/1974 | Barron | 521/88 |
| 3,836,560 | 9/1974 | Prokai | 260/448.8 K |
| 3,849,156 | 11/1974 | Marlin | 428/95 |
| 3,862,879 | 1/1975 | Barron | 428/85 |
| 3,887,500 | 6/1975 | Prokai | 260/448.8 K |
| 3,895,149 | 7/1975 | Sheffler | 428/94 |
| 3,931,429 | 1/1976 | Austin | 428/315 |
| 3,947,386 | 3/1976 | Prokai | 260/448.8 K |
| 4,022,941 | 5/1977 | Prokai | 260/448.8 K |
| 4,035,529 | 7/1977 | Meisert | 428/315 |

*Primary Examiner*—Marion McCamish
*Attorney, Agent, or Firm*—J. G. Carter

[57] ABSTRACT

Tufted or woven article having a unitary backing is prepared by applying to the underside of a tufted or woven textile article, a polyurethane-forming composition comprising (A) a relatively high molecular weight polyether polyol;
(B) a relatively low molecular weight polyol;
(C) an organic polyisocyanate or polyisothiocyanate;
(D) an inorganic filler component.

The present invention describes a carpet comprising (I) a primary backing; (II) a yarn tufted or woven through said primary backing thereby creating a yarn bundle on the underside of the resultant tufted or woven textile article and (III) a polyurethane composition applied to the underside thereby encapsulating the yarn bundles and adhering the yarn bundles to the primary backing; said polyurethane composition comprising the catalyzed reaction product of the composition described above.

40 Claims, No Drawings

POLYURETHANE BACKED CARPET

FIELD OF THE INVENTION

The present invention relates to polyurethane forming compositions for use as coatings on articles used in the floor covering and upholstery industries. More specifically, the present invention is directed to filled polyurethane adhesive compositions which can be applied to carpets or upholstery goods as a unitary backing, a precoat adhesive, or a laminating adhesive.

BACKGROUND OF THE INVENTION

The majority of carpets or upholstery goods are made by tufting or weaving yarn into a primary backing, such as a woven or nonwoven textile base. The pile loops or tufts are not securely fastened in the tufting or weaving process and can be easily pulled from the primary backing. Necessary anchorage is provided by applying a free flowing adhesive material to the backside of the carpet. This anchorage is commonly referred to as tuft lock. Another important physical property of carpet is dimensional stability. Carpets or upholstery goods having good dimensional stability do not tend to creep and buckle under normal use. Currently, the carpet industry achieves dimensional stability with the use of a secondary backing. Common secondary backings being used in the industry include both natural and synthetic woven or non-woven fabrics. Jute is a common example of a natural woven secondary backing. Synthetic secondary backings are typically made from polypropylene and can be either woven or non-woven. The backings are laminated to the backside of the carpet with latex based adhesives. Carpets and upholstery goods having a secondary backing are used principally on residential carpeting. Without this additional secondary backing material applied to the adhesive material on the backside of the carpet, the carpet is said to have a unitary backing. Carpets having a unitary backing are used principally in commercial applications. The majority of commercial carpeting is installed directly on the floor using water based adhesives. The basic requirements for commercial carpeting are that they have good tuft lock and can be easily installed with water based latex adhesives. The major problems associated with installation is a curling phenomenon occurring at the peripheral edges of the carpet known as edge curl. Tuft lock performance and edge curl are interrelated. Commercial carpeting backed with urethane compositions and possessing good tuft lock normally has severe edge curl problems. Likewise, carpeting having acceptable edge curling properties is deficient in tuft lock. Commercial carpeting exhibiting severe edge curl must be installed with expensive adhesives.

The current polyurethane unitary carpet backing systems known in the art all possess good dimensional stability, bundle wrap and pilling and fuzzing characteristics. However, they do not possess adequate tuft lock performance with acceptable edge curl characteristics.

The present invention not only provides carpeting with good dimensional stability, bundle wrap and pilling and fuzzing characteristics but adequate and often much improved tuft lock performance with acceptable edge curling properties. Adequate tuft lock performance is characterized by having a force greater than about 12 pounds (5.44 kilograms) necessary to pull one tuft out of the carpet. Acceptable edge curl performance is characterized by a curl of not greater than about 4.1 centimeters.

SUMMARY OF THE INVENTION

The present invention is directed to a polyurethane composition for providing a unitary backing for tufted carpets which comprises the catalyzed reaction product of a polyurethane forming mixture comprising (A) a relatively high molecular weight polyether polyol having an average of from 2 to about 8, preferably from 2 to about 3 hydroxyl groups per molecule and an average hydroxyl equivalent weight of from about 500 to about 2200, preferably from about 600 to about 2000 or a mixture of such polyols;

(B) a relatively low molecular weight polyol having an average of from about 2 to about 8, preferably from 2 to about 3 hydroxyl groups per molecule and an average equivalent weight of from about 31 to about 230 preferably from about 31 to about 200 or a mixture of such polyols;

(C) an organic polyisocyanate or polyisothiocyanate having an average of from about 2 to about 4 NCX (each X being independently O or S) groups per molecule or a mixture of such isocyanates or isothiocyanates; and (D) an inorganic filler component; wherein:

(1) components (A) and (B) are present in quantities such that the ratio of the number of hydroxyl equivalents contributed by component (B) to the number of hydroxyl equivalents contributed by component (A) is from about 0.8:1 to about 5.5:1, preferably from about 0.8:1 to about 4:1;

(2) components (A), (B) and (C) are present in quantities so as to provide an NCX to OH ratio of from about 0.95:1 to about 1.5:1, preferably from about 1:1 to about 1.25:1; with the proviso that the NCX:OH ratio is sufficient to provide a tuft lock value of at least about 12 pounds (5.44 kg) and the edge curl value is not greater than about 4.1 centimeters at the particular ratio at which components (A) and (B) are employed and the particular equivalent weights at which components (A) and (B) are employed;

(3) wherein component (D) is present in quantities of from about 50 parts to about 300 parts, preferably from about 60 parts to about 250 parts per 100 parts by weight of liquid reactants; and (4) the time required for the catalyzed, filled, unfrothed polyurethane forming mixture to reach a Brookfield viscosity of 20,000 centipoise is greater than about 70 seconds measured from the time the catalyst is added to a mixture of the other components, said catalyst being added when the temperature of the uncatalyzed mixture is about 93° F., ±1° F.

The present invention is also directed to a carpet comprising (I) a primary backing; (II) a yarn tufted or woven through said primary backing thereby creating a yarn bundle on the underside of the resultant tufted or woven greige good and (III) a polyurethane composition applied to the underside thereby encapsulating the yarn bundles and adhering the yarn bundles to the primary backing; said polyurethane composition comprising the catalyzed reaction product of a mixture comprising (A) a relatively high molecular weight polyether polyol having an average of from 2 to about 8 hydroxyl groups per molecule and an average hydroxyl equivalent weight of from about 500 to about 2200, preferably from about 600 to about 2000 or a mixture of such polyols;

(B) a relatively low molecular weight polyol having an average of from about 2 to about 8 hydroxyl groups per molecule and an average equivalent weight of from about 31 to about 230, preferably from about 31 to about 200 or a mixture of such polyols;

(C) an organic polyisocyanate or polyisothiocyanate having an average of from about 2 to about 4 NCX (each X being independently O or S) groups per molecule or a mixture of such isocyanates or isothiocyanates; and (D) an inorganic filler component wherein:

(1) components (A) and (B) are present in quantities such that the ratio of the number of hydroxyl equivalents contributed by component (B) to the number of hydroxyl equivalents contributed by component (A) is from about 0.8:1 to about 5.5:1, preferably from about 0.8:1 to about 4:1;

(2) components (A), (B) and (C) are present in quantities so as to provide an NCX to OH ratio of from about 0.95:1 to about 1.5:1, preferably from about 1:1 to about 1.25:1 with the proviso that the NCX:OH ratio is sufficient to provide a tuft lock value of at least about 12 pounds (5.44 kg) and the edge curl value is not greater than about 4.1 centimeters at the particular ratio at which components (A) and (B) are employed and the particular equivalent weights at which components (A) and (B) are employed;

(3) wherein component (D) is present in quantities of from about 50 parts to about 300 parts, preferably from about 60 parts to about 250 parts per 100 parts by weight of liquid reactants;

and wherein (a) said carpet has a tuft lock of at least about 12 pounds (5.44 kg) and an edge curl of not greater than about 4.1 centimeters and (b) the time required for the catalyzed, filled, unfrothed polyurethane forming mixture to reach a Brookfield viscosity of 20,000 centipoise is greater than about 70 seconds measured from the time the catalyst is added to a mixture of the other components, said catalyst being added when the temperature of the uncatalyzed mixture is about 93° F., ±1° F.

DESCRIPTION OF THE PREFERRED EMBODIMENTS

Suitable relatively high molecular weight polyether polyols which can be employed in the present invention include adducts of one or more compounds containing 2 to 8 hydroxyl groups per molecule and one or more hydrocarbylene or halogen substituted hydrocarbylene oxides.

Suitable hydroxyl containing compounds include those having from about 2 to about 20, preferably from about 2 to about 6 carbon atoms such as, for example, water, ethylene glycol, diethylene glycol, propylene glycol, 1,2-butane diol, 1,3-butane diol, 1,4-butane diol, glycerine, trimethylol propane, p,p'-isopropylidine diphenol, mixtures thereof and the like.

Suitable hydrocarbylene or halogen substituted hydrocarbylene oxides which can be employed to prepare polyether polyols include those having from 2 to about 12, preferably from 2 to about 4 carbon atoms such as, for example, ethylene oxide, propylene oxide, 1,2-butylene oxide, 2,3-butylene oxide, styrene oxide, epichlorohydrin, epibromohydrin, 3-methyl-1,2-butylene oxide, 3,3,-dimethyl-1,2-butylene oxide, mixtures thereof and the like.

Other relatively high molecular weight polyols which can be employed herein include polymer-containing polyols such as, for example, those disclosed in U.S. Pat. Nos. Re. 29,118 (Stamberger), 28,715 (Stamberger), 29,014 (Pizzini et al) and U.S. Pat. No. 3,869,413 (Blankenship et al) all of which are incorporated herein by reference.

Suitable low molecular weight polyols include, for example, ethylene glycol, propylene glycol, 1,3-propane diol, 1,4-butane diol, dipropylene glycol, diethylene glycol, triethylene glycol, tetraethylene glycol, tripropylene glycol, tetrapropylene glycol, heptapropylene glycol, mixtures thereof and the like.

Also suitable as low molecular weight polyols are adducts of initiator compounds having from 2 to about 8 active hydrogen atoms per molecule and a hydrocarbylene oxide as hereinbefore described so long as the resultant adduct has the desired equivalent weight for the low equivalent weight polyol.

Particularly suitable initiator compounds include, for example, water, ethylene glycol, propylene glycol, glycerine, trimethylol propane, aniline, ammonia, ethylene diamine, diethylenetriamine, aminoethylethanolamine, pentaerythritol, glucose, fructose, sucrose, sorbitol, mixtures thereof and the like.

When adducts of initiator compounds having more than about 8 active hydrogen atoms per molecule are employed, they must be employed in admixture with polyols having less than about 8 hydroxyl groups per molecule in quantities so as to result in an average of from 2 to about 8 hydroxyl groups per molecule.

Suitable organic polyisocyanates include, for example, 2,4-toluenediisocyanate, 2,6-toluenediisocyanate, xylylenediisocyanate, p,p'-diphenylmethanediisocyanate, p-phenylenediisocyanate, naphthalenediisocyanate, dianisodine diisocyanate, polymethylene polyphenylisocyanate, hexamethylene diisocyanate, mixtures thereof and the like.

Also suitable are the isocyanate terminated prepolymers prepared from one or more of the above mentioned polyisocyanates and one or more of the above mentioned polyols.

Suitable also are the trimerized diisocyanates and crude diisocyanates.

Also suitable are the corresponding polyisothiocyanates, including isothiocyanate terminated prepolymers.

Suitable catalysts which can be employed include, for example, tertiary amines, organometallic compounds, particularly metal carboxylates, mixtures thereof and the like.

Particularly suitable catalysts include, for example, di-n-butyl tin-bis(mercaptoacetic acid isooctyl ester), dimethyl tin dilaurate, dibutyl tin dilaurate, stannous octoate, lead octoate, triethylene diamine, N-methyl morpholine, mixtures thereof and the like.

Suitable inorganic filler materials which can be employed herein include, for example, calcium carbonate, alumina trihydrate, talc, bentonite, antimony trioxide, kaolin, barytes either as obtained or treated with fatty acids or organotitanates, mixtures thereof and the like.

If desired, the formulations can contain flame suppressing agents such as, for example, dibromoneopentyl glycol, tris(dichloropropyl) phosphate, polyammonium phosphate, beta-chloroethyl phosphonate ester, chlorophosphate ester, polymers and copolymers of vinyl chloride and vinylidene chloride, mixtures thereof and the like.

The polyurethane backing can be either foamed or unfoamed. In those instances where foaming is desired, such can be accomplished by using the inert gas frothing technique or the volatile liquid blowing agent technique or combinations thereof in conjunction with a surfactive agent such as the commercially available block polysiloxane-polyoxyalkylene copolymers.

Suitable primary backing materials which can be employed in the present invention include those prepared from, for example, jute, polypropylene, nylon, polyesters, polyacrylates and the like.

Suitable yarns which can be tufted into the primary backing include those prepared from, for example, wool, nylon, polyester, acrylic, cotton, polypropylene, polyethylene, blends thereof and the like.

While the NCX:OH ratio can vary from about 0.95:1 to about 1.5:1, the particular ratio employed is that which provides a tuft lock value of at least about 12 pounds and an edge curl value of not greater than about 4.1 centimeters at the particular ratio in which components (A) and (B) are employed and the particular equivalent weights of Components (A) and (B).

Therefore, at a ratio of Components (B):(A) of 0.8:1 the NCX:OH ratio can be from about 1.21:1 to about 1.5:1; whereas at a ratio of Components (B):(A) of 2.66:1 the suitable NCX:OH ratio is from about 1.03:1 to about 1.5:1 while for a ratio of Components (B):(A) of 4.33:1 the suitable index ratio is from about 0.95:1 to about 1.25:1.

When the equivalent weight of component (A) is about 500, an NCX:OH ratio of greater than about 1.25:1 results in an edge curl value greater than about 4.1 centimeters; whereas when the equivalent weight of Component (A) is about 2200, an NCX:OH ratio of less than about 1.42:1 results in a tuft lock value below about 12 pounds.

When component (B) is employed at an equivalent weight of about 31 an NCX:OH ratio above 1.24:1 results in an edge curl value greater than about 4.1 centimeters and when component (B) is employed at an equivalent weight of about 230 an NCX:OH ratio below about 1.25:1, a tuft lock value of less than about 12 pounds is obtained.

The polyurethane-forming froth is obtained by mechanically inducing an inert gas into the foam-forming composition. This is readily accomplished by a mixer such as a hand kitchen mixer fitted with a blade designed to mechanically whip or blend air or the inert gas into the mixture of urethane-forming components such as the type of blade employed in preparing whipped cream or for preparing meringue from egg whites or the like. Another method, which is more readily adaptable to large scale production is by feeding a stream composed of a mixture of the urethane-forming components or separate streams of the urethane-forming components and a stream of air or other inert gas into a suitable froth generator-mixer such as, for example, an Oakes foamer whereupon the frothed composition which emerges from the froth generator-mixer is directed onto the underside of the tufted or woven primary backing whereupon the froth composition thermosets into a flexible polyurethane foam.

Still another method is to feed the inert gas and all of the urethane-forming components except for the catalyst into the froth generator-mixer and subsequently mixing the catalyst with the resultant froth in a suitable mixer such as a static mixer and then directing the resultant catalyst-containing froth onto the underside of the tufted primary backing.

Suitable inert gaseous substances which are employed in the present invention include any gaseous element, compound, or mixture thereof which exist in the gaseous state under standard conditions of temperature and pressure i.e. 25° C. and 1 atmosphere, including for example, xenon, helium, carbon dioxide, nitrogen, oxygen, propane, methane, ethane or mixtures thereof such as, for example, air and the like, provided such does not react with any of the urethane forming components.

For purposes of determining the tuft lock for the present invention, values must be determined on unfoamed or unfrothed compositions employing the particular greige good employed in Example 1 because when the urethane composition is frothed, the tuft lock values are reduced somewhat and for those having tuft lock values in an unfrothed formulation of just above about 12 pounds then the same formulation in a frothed condition would result in tuft lock values below about 12 pounds; but nevertheless such are still within the purview of the present invention. Also, for the same urethane formulation employed on a different greige good, the tuft lock values can fall below about 12 pounds. Nevertheless, the urethane compositions claimed and described herein provide the optimum values for tuft lock for any greige good although some of the particular greige goods would result in tuft lock values below about 12 pounds with a formulation which results in a tuft lock above about 12 pounds when employed with the greige good of Example 1.

The following examples are illustrative of the invention, but are not to be construed as to limiting the scope thereof in any manner.

DETERMINATION OF EDGE CURL

In these examples and comparative experiments, the edge curl test is conducted by wetting a 6.75 inch×2.0 inch (where the 6.75 inch cut is parallel to the tuft roll) of the urethane backed carpet sample with water and positioning the wetted sample (backing down) on a flat surface. A weight heavy enough to hold one side of the carpet firmly down on the surface is placed on the first two inches of the sample opposite the end to be measured. The sample is left undisturbed for 30 minutes. After this time the extent of curl, or the distance from the flat surface to the back side of the outer edge of the carpet sample, is measured in centimeters.

DETERMINATION OF TUFT LOCK

The tuft lock test employed in the examples and comparative experiments was the Federal Test Method STandard DFL-22.

In this test, the carpet is cut into a 2"×6" sample and bent around a ¾" mandril with the tufts outward. The sample is mounted in the load sensing jaw of a tensile testing machine such as an Instron. A hook is placed in the traveling jaw of the instrument and one tuft is carefully hooked. The sample is pulled at the rate of 10 inches per minute and the force necessary to pull the tuft out of the carpet is reported in pounds.

MEASUREMENTS OF THE VISCOSITY OF THE REACTING COMPOSITION

The viscosity of the catalyzed composition is measured using a Brookfield LVF using a #3 spindle rotating at 6 revolutions per minute. The time to reach 20,000 centipoise is noted for a particular composition.

PROCEDURE FOR PREPARING THE COMPOSITION FOR VISCOSITY MEASUREMENT OF FOR COATING CARPET

To a one quart paper cup 100 grams of the desired polyol mixture is added. The desired amount of filler is mixed, using a high speed stirrer, into the polyol mixture. The appropriate amount of isocyanate is added and mixed similarly for an additional one minute and 30 seconds or until the temperature of the uncatalyzed composition reaches 93° F.±1° F. The appropriate amount of catalyst is added and mixed for an additional 30 seconds. The catalyzed composition is either doctored onto the back of the Executive Council carpeting within 45 seconds from the time of addition of the catalyst and cured for either minutes at 120° C. or the time from the addition of the catalyst to 20,000 centipoise is measured with the viscometer.

DETERMINATION OF THE COATING WEIGHT

A 6.75 inch by 6.75 inch square is cut out of the carpet sample prepared by the above mentioned method. This sample is weighed to the nearest 0.1 gram. This weight minus the greige weight is referred to as the coating weight and normally is reported in $oz/yd^2$.

DETERMINATION OF PENETRATION WEIGHT

Three tuft rows or strands of fiber are removed from the above specimen. All the loose urethane is removed from the strands. The strands are weighed on an analytical balance and an average for the three strands is recorded. This weight minus the average weight for three strands taken from a 6.75 by 6.75 greige goods sample is determined. This weight is multiplied by the number of strands in the 6.75 by 6.75 greige sample to get the penetration weight on an $oz/yd^2$ basis.

In the following examples,
pbw = parts by weight;
MW = average molecular weight;
EW = average active hydrogen equivalent weight;
f = average functionality; and
NCO:OH ratio = equivalents of NCO groups divided by equivalents of OH groups.

EXAMPLE 1

To a reactor was charged 85 grams of a liquid polyoxypropylene glycol having a molecular weight of about 2000, an equivalent weight of about 1000 and a hydroxyl functionality of about 2. With the polyol was mixed 15 grams of dipropylene glycol having a molecular weight of 134, an equivalent weight of about 67, and a hydroxyl functonality of about 2. To the polyol blend was mixed 30 grams of alumina trihydrate, commercially available from Kaiser Aluminum Company as H36U, and 175 grams of calcium carbonate, commercially availabe from the Georgia Marble Company as D-70. To the polyol/filler mixture was blended about 60 grams of a toluene-diisocyanate prepolymer prepared from 76.8 grams of toluene diisocyanate having an isomer ratio of about 80 weight percent 2,4 toluene diisocyanate and about 20 weight percent 2,6 toluene diisocyante, a molecular weight of about 174, an equivalent weight of about 87 and an isocyanate functionality of about 2, 14.7 grams of a liquid polyoxyethylene glycol having a molecular weight of about 200, an equivalent weight of about 100 and a hydroxyl functionality of about 2, and 8.5 grams of a glycerine initiated polyether triol having a molecular weight of about 260, an equivalent weight of about 87 and a hydroxyl functionality of about 3. The prepolymer had a percent NCO content of about 26.8 and an equivalent weight of about 156.7. The urethane-forming composition had an NCO:OH ratio of 1.25:1 and a Brookfield viscosity at 60 rpm using a #5 spindle of about 6024 centipoise at about 25° C. The catalyst was omitted from the formulation to prevent polymerization during the viscosity measurement. To the reaction mixture was added about 0.2 grams of an organotin catalyst, commercially available from the Witco Chemical Company as Fomrez UL-28. The reaction mixture was blended well and doctored onto the back of a commercial grade of carpet made of 4 ply Antron® brand nylon fibers weighing about 27.0 oz/$yd^2$ and tufted through a woven polypropylene primary backing at the rate of about 8.0 stitches per inch. The greige good is characterized by having a pile height of about 0.156 inches, a WDF of about 164,000 and a greige weight of about 31.0 oz/$yd^2$. The sample containing the urethane backing was cured at 120° C. for 8 minutes.

The carpet sample had a urethane coating weight of about 35 oz/$yd^2$. The bundle wrap was determined to be about 95%. The carpet had a tuft lock of about 19.5 pounds with an edge curl of about 1.5 centimeters.

In general, the tuft lock and edge curl performances are not only affected by the style of carpet, but by the amount of urethane coating which is on the back. Therefore, comparisons must be made on the same style of carpet and at similar coating weights within about 5.0 oz/$yd^2$.

COMPARATIVE EXPERIMENT A

Example II of U.S. Pat. No. 3,730,822 was essentially duplicated employing the following composition.
157.0 pbw Wyandotte PPG 1010, MW=1000, f=2
147.5 pbw Wyandotte TPE 1540, MW=1500, f=3
91.35 pbw titanium dioxide, particle size less than 325 mesh
48.70 pbw zinc oxide, particle size less than 100 mesh
73.10 pbw calcium carbonate, particle size less than 100 mesh
85.8 pbw Isonate 143L
0.8 pbw dibutyltin dilaurate
filler/liquid reactants weight ratio=54.6/100
NCO:OH ratio in formulation=0.98:1.

This formulation was mixed well and spread onto the back of the same carpet used in Example 1 of this invention. The system was cured at 25° C. for 15 minutes.

The physical properties of this carpet as well as those of the carpet prepared in Example 1 are given in Table I.

TABLE I

| Properties | Example 1 | Comp. Expt. A |
|---|---|---|
| Coating weight, oz/$yd^2$ (gm/$m^2$) | 35.0 (1186.85) | 35.9 (1217.37) |
| Tuft Lock, lbs (kg) | 19.5 (8.85) | 10.7 (4.86) |
| Edge Curl, cm | 1.5 | 0.3 |
| Bundle Wrap, % | 95 | 95 |

EXAMPLE 2

Carpet was backed employing relative high molecular weight polyols of various molecular weights. The procedure was the same as that employed in Example 1.

SAMPLE A 51.63 pbw polyoxypropylene glycol, MW=1200, f=2
15 pbw dipropylene glycol, MW=134, f=2
23.74 pbw alumina trihydrate
138.48 pbw calcium carbonate
60 pbw isocyanate prepolymer employed in Example 1, EW=156.7
0.13 pbw catalyst, Fomrez UL-28
filler/liquid reactants weight ratio=128.1/100
NCO:OH ratio in formulation=1.25:1.

SAMPLE B 85 pbw polyoxypropylene glycol, MW=2000, f=2
15 pbw dipropylene glycol, MW=134, f=2
30 pbw alumina trihydrate
175 pbw calcium carbonate
60 pbw isocyanate prepolymer employed in Example 1, EW=156.7
0.2 pbw catalyst, Formez UL-28
filler/liquid reactants weight ratio=128.1/100
NCO:OH ratio in formulation=1.25:1.

SAMPLE C (COMPARATIVE)

162.53 pbw polyoxypropylene glycol, MW=4000, f=2
15 pbw dipropylene glycol, MW=134, f=2
44.3 pbw alumina trihydrate
259 pbw calcium carbonate
60 pbw isocyanate prepolymer employed in Example 1, EW=156.7
0.35 pbw catalyst, Fomrez UL-28
filler/liquid reactants weight ratio=128.1/100
NCO:OH ratio in formulation=1.25:1.

SAMPLE D

Same as in Sample C except that the NCO:OH ratio in the formulation was 1.45:1 and the filler employed was 46.1 pbw alumina trihydrate and 269.3 plus calcium carbonate and the filler/liquid reactants weight ratio was 128.1/100.

The properties of the resultant carpet examples are given in Table II.

TABLE II

| Sample | Long Chain Polyol Equivalent Wt | System Viscosity Centipoise @ 77° F. | Coating Wt. oz/yd$^2$(g/m$^2$) | Tuft Lock lbs(kg) | Edge Curl cm. |
|---|---|---|---|---|---|
| A | 600 | 8803 | 33.3(1129.38) | 26.5(12.03) | 2.8 |
| B | 1000 | 6024 | 30.6(203.46) | 19.5(8.85) | 2.0 |
| C* | 2000 | 9715 | 35.0(1186.85) | 10.0(4.54) | 1.0 |
| D | 2000 | 11072 | 33.3(1129.38) | 12.5(5.44) | 1.6 |

*Comparative - The tuft lock value was below 12 lbs. because the NCO/OH ratio of 1.25/1 was below the 1.42:1 ratio required for a high molecular weight polyol having a 2000 equivalent weight.

Extrapolation from a plot of the above data indicates that (1) if the equivalent weight of the long chain polyol is below about 500, the edge curl would be such that the system would be very difficult to install, and (2) if the equivalent weight of the polyol is greater than about 2200, the system would not have the necessary tuft lock.

EXAMPLE 3

Carpet was backed employing various quantities of short chain polyol. The procedure was the same as that employed in Example 1.

SAMPLE A (COMPARATIVE)

85 pbw polyoxypropylene glycol, MW=2000, f=2
25 pbw dipropylene glycol, MW=134, f=2
37.48 pbw alumina trihydrate
218.69 pbw calcium carbonate
89.94 pbw isocyanate prepolymer employed in Example 1, EW=156.7
0.22 pbw catalyst, Fomrez UL-28
filler/liquid reactants weight ratio=128.1/100
NCO:OH ratio in formulation=1.25:1.

SAMPLE B 85 pbw polyoxypropylene glycol, MW=2000, f=2
15 pbw dipropylene glycol, MW=134, f=2
30 pbw alumina trihydrate
175 pbw calcium carbonate
60 pbw isocyanate prepolymer employed in Example 1, EW=156.7
0.2 pbw catalyst, Fomrez UL-28
filler/liquid reactants weight ratio=128.1/100
NCO:OH ratio in formulation=1.25:1.

SAMPLE C 85 pbw polyoxypropylene glycol, MW=2000, f=2
5 pbw dipropylene glycol, MW=134, f=2
22.77 pbw alumina trihydrate
132.83 pbw calcium carbonate
31.47 pbw isocyanate prepolymer employed in Example 1, EW=156.7
0.18 pbw catalyst, Fomrez UL-28
filler/liquid reactants weight ratio=128.1/100
NCO:OH ratio in formulation=1.25:1.

The properties of the resultant carpet samples are given in the following Table III.

TABLE III

| Sample | Equivalent Ratio Short Chain Polyol/Long Chain Polyol | System Viscosity Centipoise @ 77° F. | Coating Wt. oz/yd$^2$(g/m$^2$) | Tuft Lock lbs(kg) | Edge Curl cm. |
|---|---|---|---|---|---|
| A* | 4.33 | 8103 | 36.8(1247.89) | 30.2(13.71) | 6.2 |
| B | 2.60 | 6024 | 35.4(1200.41) | 20.4(9.26) | 1.5 |
| C | 0.86 | 4921 | 38.7(1312.32) | 12.0(5.45) | 0.4 |

*COMPARATIVE - edge curl significantly above 4.1 centimeters because NCO:OH ratio of 1.25:1 is too high for a component (B) to component (A) ratio of 4.39/1.

Extrapolation from a plot of the above data indicates that (1) if the number of hydroxyl equivalents contributed by the short chain polyol to the number of hydroxyl equivalents contributed by the long chain polyol ratio is greater than about 4.39/1 at the 1.25/1 NCO/OH ratio employed, then the edge curl would be such that the carpet would be very difficult to install since its edge curl value exceeds about 4.1 cm. and (2) if the ratio is less than about 0.8 at the 1.25/1 NCO/OH ratio employed then the carpet system would not have the necessary tuft lock.

EXAMPLE 4

Carpet was backed with polyurethane compositions having various filler/liquid reactant ratios. The procedure was the same as that employed in Example 1.

SAMPLE A 85 pbw polyoxypropylene glycol, MW=2000, f=2
15 pbw dipropylene glycol, MW=134, f=2
11.7 pbw alumina trihydrate 68.29 pbw calcium carbonate
60 pbw isocyanate prepolymer employed in Example 1, EW=156.7
0.2 pbw catalyst, Fomrez UL-28
filler/liquid reactants weight ratio=50.0/100
NCO:OH ratio in formulation=1.25:1.

SAMPLE B 85 pbw polyoxypropylene glycol, MW=2000, f=2
15 pbw dipropylene glycol, MW=134, f=2
14.68 pbw alumina trihydrate
85.35 pbw calcium carbonate
60 pbw isocyanate prepolymer employed in Example 1, EW=156.7
0.2 pbw catalyst, Fomrez UL-28
filler/liquid reactants weight ratio=62.5/100
NCO:OH ratio in formulation=1.25:1.

SAMPLE C

Same as Sample B of Example 2.

SAMPLE D 85 pbw polyoxypropylene glycol, MW=2000, f=2
15 pbw dipropylene glycol, MW=134, f=2
44.62 pbw alumina trihydrate
260.33 pbw calcium carbonate
60 pbw isocyanate prepolymer employed in Example 1, EW=156.7
0.2 pbw catalyst, Fomrez UL-28
filler/liquid reactants weight ratio=190.6/100
NCO:OH ratio in formulation=1.25:1.

SAMPLE E

Same as Sample D except that the filler employed was 58.53 pbw alumina trihydrate and 341.46 pbw of calcium carbonate resulting in a filler/liquid reactants weight ratio of 250/100.

The properties of the resultant carpet samples are given in the following Table IV.

TABLE IV

| Sample | pbw Filler/ 100 pbw Liquid Reactants | System Viscosity Centipoise @ 77° F. | Coating Wt. oz/yd$^2$(g/m$^2$) | Tuft Lock lbs(kg) | Edge Curl cm. |
|---|---|---|---|---|---|
| A | 50 | 1697 | 31 (1051.21) | 28.25(12.82) | 1.5 |
| B | 62.5 | 3818 | 30.5(1034.26) | 20.8(9.44) | 1.5 |
| C | 128.1 | 6024 | 30.6(1037.65) | 19.5(8.85) | 1.5 |
| D | 190.6 | 70425 | 34.3(1163.11) | 15.7(7.13) | 1.3 |
| E | 250. | N.D. | 38 (1288.58) | 18.5(8.4) | 1.5 |

N.D. - Not determinable with a #5 spindle.

Extrapolation from a plot of the above data indicates that tuft lock and edge curl are affected very little by filler amount. However, system processing is affected by the resultant viscosity of the system due to the filler level. Filler levels below about 50 pbw/100 pbw liquid reactants would be too fluid causing excessive soak-in of the urethane composition into the carpet fibers and filler levels above about 250 pbw/100 pbw liquid reactants would be difficult to process because the viscosity would be too high to pump the material.

EXAMPLE 5

Carpet was backed employing polyurethane-formulations having varying NCO:OH ratios. The procedure was the same as that employed in Example 1.

FORMULATION A (COMPARATIVE)

85 pbw polyoxypropylene glycol, MW=2000, f=2
15 pbw dipropylene glycol, MW=134, f=2
27.27 pbw alumina trihydrate
159.09 pbw calcium carbonate
45.6 pbw isocyanate prepolymer employed in Example 1, EW=156.7
0.2 pbw catalyst, Fomrez UL-28
filler/liquid reactants weight ratio=128.1/100
NCO:OH ratio in formulation=0.95:1).

FORMULATION B (COMPARATIVE)

85 pbw polyoxypropylene glycol, MW=2000, f=2
15 pbw dipropylene glycol, MW=134, f=2
27.66 pbw alumina trihydrate
161.4 pbw calcium carbonate
47.6 pbw isocyanate prepolymer employed in Example 1, EW=156.7
0.2 pbw catalyst, Fomrez UL-28
filler/liquid reactants weight ratio=128.1/100
NCO:OH ratio in formulation=0.98:1:

FORMULATION C 85 pbw polyoxypropylene glycol, MW=2000, f=2
15 pbw dipropylene glycol, MW=134, f=2
28.76 pbw alumina trihydrate
167.76 pbw calcium carbonate
53.41 pbw isocyanate prepolymer employed in Example 1, EW=156.7
0.2 pbw catalyst, Fomrez UL-28
filler/liquid reactants weight ratio=128.1/100
NCO/OH ratio in formulation=1.1:1.

FORMULATION D

Same as Sample B of Example 2.

FORMULATION E (COMPARATIVE)

85 pbw polyoxypropylene glycol, MW=2000, f=2
15 pbw dipropylene glycol, MW=134, f=2
33.11 pbw alumina trihydrate
193.19 pbw calcium carbonate
76.8 pbw isocyanate prepolymer employed in Example 1, EW=156.7
0.2 pbw catalyst, Fomrez UL-28
filler/liquid reactants weight ratio=128.1/100
NCO/OH ratio in formulation=1.6:1.

The properties of the resultant carpet samples are given in the following Table V.

TABLE V

| Sample | (NCO/OH) | System Viscosity Centipoise @ 77° F. | Coating Wt. oz/yd$^2$(g/m$^2$) | Tuft Lock lbs(kg) | Edge Curl cm. |
|---|---|---|---|---|---|
| A[1] | 0.95 | 6576 | 34 (1152.94) | 8 (3.63) | 0.0 |
| B[1] | 0.98 | N.D.[3] | 34 (1152.94) | 6.8(3.09) | 0.0 |
| C | 1.10 | N.D. | 34.6(1173.29) | 19.2(8.72) | 0.8 |
| D | 1.25 | 6024 | 30.6(1037.65) | 19.5(8.85) | 1.5 |
| E[2] | 1.60 | 8697 | 30 (1017.3) | 26.25(11.92) | 5.3 |

[1]COMPARATIVE - tuft lock values below 12 pounds because for the 2.66/1 equivalent ratio of B/A, the NCO/OH ratios of 0.95/1 and 0.98/1 are below 1.03:1.
[2]COMPARATIVE - edge curl value above 4.1 centimeters because for the 2.66/1 equivalent ratio of B/A, the NCO/OH ratio of 1.6/1 is greater than 1.5/1.
[3]N.D. - Not determined The trend exemplified by a plot of the above data indicates that (1) systems with an NCO:OH ratio below about 1.03:1 would not have adequate tuft lock, and (2)

systems above about 1.5:1 NCO:OH ratio would be very difficult to install due to poor edge curl.

EXAMPLE 6

Carpet samples were backed with polyurethane compositions having varying molecular weights for the low molecular weight polyol. The procedure was the same as that employed in Example 1.

SAMPLE A 85 pbw polyoxypropylene glycol, MW=2000, f=2
6.9 pbw ethylene glycol, MW=62, f=2
28.4 pbw alumina trihydrate
165.9 pbw calcium carbonate
60 pbw isocyanate prepolymer employed in Example 1, EW=156.7
0.19 pbw catalyst, Fomrez UL-28
filler/liquid reactant weight ratio=128.1/100
NCO:OH ratio in formulation=1.25:1.

SAMPLE B 85 pbw polyoxypropylene glycol, MW=2000, f=2
8.5 pbw propylene glycol, MW=76, f=2
28 pbw alumina trihydrate
163.6 pbw calcium carbonate
60 pbw isocyanate prepolymer employed in Example 1, EW=156.7
0.19 pbw catalyst, Fomrez UL-28
filler/liquid reactant weight ratio=128.1/100
NCO:OH ratio in formulation=1.25:1.

SAMPLE C 85 pbw polyoxypropylene glycol, MW=2000, f=2
15 pbw dipropylene glycol, MW=134, f=2
30 pbw alumina trihydrate
175 pbw calcium carbonate
60 pbw isocyanate prepolymer employed in Example 1, EW=156.7
0.2 pbw catalyst, Fomrez UL-28
filler/liquid reactant weight ratio=128.1/100
NCO:OH ratio in formulation=1.25:1.

SAMPLE D 85 pbw polyoxypropylene glycol, MW=2000, f=2
21.5 pbw tripropylene glycol, MW=192, f=2
31.2 pbw alumina trihydrate
182.1 pbw calcium carbonate
60 pbw isocyanate prepolymer employed in Example 1, EW=156.7
0.21 pbw catalyst, Fomrez UL-28
filler/liquid reactants weight ratio=128.1/100
NCO:OH ratio in formulation=1.25:1.

SAMPLE E 85 pbw polyoxypropylene glycol, MW=2000, f=2
44.8 pbw polyoxypropylene glycol, MW=400, f=2
35.6 pbw alumina trihydrate
207.6 pbw calcium carbonate
60 pbw isocyanate prepolymer employed in Example 1, EW=156.7
0.26 pbw catalyst, Fomrez UL-28
filler/liquid reactants weight ratio=128.1/100
NCO:OH ratio in formation=1.25:1.

The properties of the resultant carpet samples are given in the following Table VI.

TABLE VI

| Sample | Equivalent Weight of Low Molecular Weight Polyol | System Viscosity Centipoise @ 77° F. | Coating Wt. oz/yd$^2$(g/m$^2$) | Tuft Lock lbs(kg) | Edge Curl cm. |
|---|---|---|---|---|---|
| A | 31 | N.D.* | 34.8(1180.06) | 20.6(9.6) | 4.0 |
| B | 38 | 13257 | 30 (1017.3) | 23 (10.44) | 1.9 |
| C | 67 | 6024 | 33 (1119.03) | 20 (9.08) | 2.0 |
| D | 96 | N.D. | 35 (1186.85) | 19.8(8.89) | 1.3 |
| E | 200 | 3818 | 35 (1186.85) | 17.0(7.72) | 0.5 |

*N.D. - Not determined

The trend exemplified by a plot of the above data indicates that if the equivalent weight of the low molecular weight polyol is below about 31 the edge curl would be such that the carpet system would be difficult to install since the edge curl value would be above about 4.1 cm.

EXAMPLE 7

Carpet samples were backed with polyurethane compositions employing various polyisocyanates. The procedure was the same as that employed in Example 1.

SAMPLE A 85 pbw polyoxypropylene glycol, MW=2000, f=2
15 pbw dipropylene glycol, MW=134, f=2
25.06 pbw alumina trihydrate
146.21 pbw calcium carbonate
33.7 pbw 80/20 mixture of 2,4-/2,6-toluene diisocyanate,
0.2 pbw catalyst, Fomrez UL-28
filler/liquid reactants weight ratio=128.1/100
NCO:OH ratio in formulation=1.25:1.

SAMPLE B 85 pbw polyoxypropylene glycol, MW=2000, f=2
15 pbw dipropylene glycol, MW=134, f=2
29.12 pbw alumina trihydrate
169.92 pbw calcium carbonate
55.39 pbw modified diphenylmethane diisocyanate containing a high percentage of pure diphenylmethane diisocyanate and a lesser amount of polycarbodiimide adducts commercially available from the Upjohn Company as ISONATE 143L having an NCO equivalent weight of about 144.
0.2 pbw catalyst, Fomrez UL-28
filler/liquid reactants weight ratio=128.1/100
NCO:OH ratio in formulation=1.25:1.

SAMPLE C 85 pbw polyoxypropylene glycol, MW=2000, f=2
15 pbw dipropylene glycol, MW=134, f=2
28.91 pbw alumina trihydrate
168.65 pbw calcium carbonate
54.33 pbw prepolymer prepared from 84 pbw of 80/20, 2,4-/2,6-toluene diisocyanate and 16 pbw dipropylene glycol. Equivalent weight of prepolymer=140.
0.2 pbw catalyst, Fomrez UL-28
filler/liquid reactants weight ratio=128.1/100
NCO:OH ratio in formulation=1.25:1.

SAMPLE D 85 pbw polyoxypropylene glycol, MW=2000, f=2
15 pbw dipropylene glycol, MW=134, f=2
28.91 pbw alumina trihydrate
168.65 pbw calcium carbonate 54.33 pbw prepolymer prepared from 81.1 pbw 80/20, 2,4-/2,6-toluene diisocyanate and 18.8 pbw of an adduct of glycerine and propylene oxide, E.W=87, F=3. The prepolymer had an NCO equivalent weight of 140.
0.2 pbw catalyst, Fomrez UL-28
filler/liquid reactants weight ratio=128.1/100
NCO:OH ratio in formulation=1.25:1.

SAMPLE E

Same as Sample B of Example 2.

The properties of the resultant carpet samples are given in the following Table VII.

TABLE VII

| Sample | System Viscosity Centipoise @ 77° F. | Coating Wt. oz/yd$^2$(g/m$^2$) | Tuft Lock lbs/(kg) | Edge Curl cm. |
|---|---|---|---|---|
| A | 1103 | 31.3(1061.38) | 17.4(7.9) | 0.0 |
| B | 2026 | 33.3(1129.2) | 17.0(7.72) | 1.1 |
| C | 4284 | 38.0(1288.58) | 17.4(7.9) | 0.0 |
| D | N.D. | 33.5(1135.99) | 22.2(10.08) | 3.3 |
| E | 6024 | 35.4(1200.41) | 20.4(9.26) | 1.5 |

N.D. - Not determined

The above data appears to indicate various types of isocyanates and prepolymers made from these isocyanates can be used in the present invention.

EXAMPLE 8

Carpet samples were backed with polyurethane compositions employing various catalysts. The procedure was the same as that employed in Example 1.

SAMPLE A 85 pbw polyoxypropylene glycol, MW=2000, f=2
15 pbw dipropylene glycol, MW=134, f=2
30 pbw alumina trihydrate
175 pbw calcium carbonate
60 pbw prepolymer employed in Example 1
0.2 pbw catalyst, dibutyl tin dilaurate filler/liquid reactants weight ratio=128.1/100
NCO:OH ratio in formulation=1.25:1.

SAMPLE B

Same as sample A above except that the catalyst was 0.2 pbw of a lead carboxylate commercially available from Tenneco, Inc. as Lead Nuodex.

SAMPLE C

Same as Sample B of Example 2.

The properties of the resultant carpet samples are given in the following Table VIII.

TABLE VIII

| Sample | Coating Wt. oz/yd$^2$(g/m$^2$) | Tuft Lock lbs(kg) | Edge Curl cm. |
|---|---|---|---|
| A | 37.7(1278.41) | 19.6(8.9) | 1.1 |
| B | 32.3(1095.29) | 26 (11.8) | 1.0 |
| C | 35.4(1200.41) | 24 (10.89) | 1.5 |

The data above indicates that these catalysts work very well in the present invention.

EXAMPLE 9

Carpet samples were backed with polyurethane compositions employing high molecular weight polyether polyols having various hydroxyl groups per molecule. The procedure was the same as that employed in Example 1.

SAMPLE A 85 pbw polyoxypropylene glycol, MW=2000, f=2
15 pbw dipropylene glycol, MW=134, f=2
30 pbw alumina trihydrate
175 pbw calcium carbonate
60 pbw prepolymer employed in Example 1
0.2 pbw catalyst, Fomrez UL-28
filler/liquid reactants weight ratio=128.1/100
NCO:OH ratio in formulation=1.25:1.

SAMPLE B 85 pbw polyoxypropylene glycol, MW=3000, f=3
15 pbw dipropylene glycol, MW=134, f=2
30 pbw alumina trihydrate
175 pbw calcium carbonate
60 pbw prepolymer employed in Example 1
0.2 pbw catalyst, Fomrez UL-28
filler/liquid reactants weight ratio=128.1/100
NCO:OH ratio in formulation=1.25:1.

SAMPLE C 85 pbw polyoxypropylene glycol, MW=4000, f=4
15 pbw dipropylene glycol, MW=134, f=2
30 pbw alumina trihydrate
175 pbw calcium carbonate
60 pbw prepolymer employed in Example 1
0.2 pbw catalyst, Fomrez UL-28
filler/liquid reactants weight ratio=128.1/100
NCO:OH ratio in formulation=1.25:1.

SAMPLE D 70.9 pbw polyoxypropylene glycol, MW=6600, f=8
15 pbw dipropylene glycol, MW=134, f=2
27.3 pbw alumina trihydrate
159.4 pbw calcium carbonate
60 pbw prepolymer employed in Example 1
0.17 pbw catalyst, Fomrez UL-28
filler/liquid reactants weight ratio=128.1/100
NCO:OH ratio in formulation=1.25:1.

The properties of the resultant carpet samples are given in the following Table IX.

TABLE IX

| Sample | High Molecular Weight Polyol Functionality | Coating Wt. oz/yd$^2$ (g/m$^2$) | Tuft Lock lbs(kg) | Edge Curl cm. |
|---|---|---|---|---|
| A | 2 | 33.4(1132.59) | 21.6(9.8) | 1.1 |
| B | 3 | 37.5(1271.62) | 24.1(10.9) | 4.1 |
| C | 4 | 38.8(1315.71) | 22.7(10.3) | 3.8 |
| D | 8 | 38.1(1291.97) | 20.0(9.1) | 2.8 |

The data from Table IX indicates that high molecular weight polyols with from 2 to 8 hydroxyl groups per molecule work very well in the present invention. However, to prevent poor edge curl from polyurethane compositions employing high molecular weight polyether polyols with functionalities of 3 to 8, the NCO:OH ratio must not be greater than about 1.25:1.

EXAMPLE 10

The following polyurethane forming formulation containing a relatively high molecular weight polyether polyol containing a copolymer of styrene and acrylonitrile was employed to coat the back of carpet employing the procedure of Example 1.

90 pbw copolymer polyol containing 79% of a 5000 MW, 3 f polyether polyol capped with 15% ethylene oxide and 21% of a copolymer of 48% styrene and 52% acrylonitrile
10 pbw diethylene glycol, MW 106, f=2
100 pbw alumina trihydrate
44.7 pbw isocyanate-containing prepolymer employed in Example 1, EW 156.7
0.1 pbw catalyst, Fomrez UL 28
filler/liquid reactants weight ratio=67.7/100
NCO:OH ratio in formulation=1.25:1.

This formulation was coated on Executive Council Carpet and gave the following results: The carpet sample had a urethane coating of about 30 oz/yd$^2$. The carpet had a tuft lock of about 13.6 pounds with an edge curl of about 2.9 cm.

EXAMPLE 11

Carpet samples were backed with polyurethane compositions employing: (1) a three functional high molecular weight triol, (2) a two functional low molecular weight polyol, and (3) a 4.7 functional low molecular weight polyol at various NCO:OH ratios. The procedure was the same as that employed in Example 1.

SAMPLE A 85.5 pbw polyoxypropylene glycol, MW=4935, f=3 15 wt. % ethylene oxide capped
9.5 pbw diethylene glycol, MW 106, f=2
5.0 pbw polyoxypropylene glycol, MW=587, f=4.7
28.3 pbw alumina trihydrate
141.6 pbw barium sulfate
41.6 pbw isocyanate prepolymer employed in Example 1
0.1 pbw catalyst Fomrez UL-6
filler/liquid reactants weight ratio=120/100
NCO:OH ratio in formulation=1.00:1.

SAMPLE B (COMPARATIVE)

Same as Sample A except that the filler and polyisocyanate employed was
29.15 pbw alumina trihydrate
145.76 pbw barium sulfate
45.76 pbw isocyanate prepolymer employed in Example 1
filler/liquid reactants weight ratio=120/100
NCO:OH ratio in formulation=1.20:1.

SAMPLE C (COMPARATIVE)

Same as Sample A except that the filler and polyisocycante employed was
30.0 pbw alumina trihydrate
150.0 pbw barium sulfate
50.0 pbw isocyanate prepolymer employed in Example 1
filler/liquid reactants weight ratio=120/100
NCO:OH ratio in formulation=1.20:1.

The properties of the resultant carpet samples are given in the following Table X.

TABLE X

| Sample | Index | System Viscosity Centipoise @ 77° F. | Coating Wt. oz/yd$^2$(g/m$^2$) | Tuft Lock lbs(kg) | Edge Curl cm. |
|---|---|---|---|---|---|
| A | 100 | 7912 | 38.8(1315.71) | 17.6(7.99) | 3.3 |
| B* | 110 | N.D.** | 38.5(1305.54) | 19.2(8.71) | 5.0 |
| C* | 120 | N.D. | 34.8(1180.07) | 18.8(8.53) | 6.5 |

*Comparative
**N.D. - Not determined

The data from Table X indicate that poor edge curl performance can exist when using combinations of high molecular weight polyether polyols with functionalities greater than 2 together with low molecular weight polyols with functionalities greater than 2. However, the poor edge curl performance can be corrected to no greater than 4.1 centimeters by adjusting the NCO:OH ratio as illustrated in Table X.

As mentioned earlier, the present invention not only provides carpeting with good dimensional stability, bundle warp and pilling and fuzzing characteristics but adequate and much improved tuft lock performance with acceptable edge curing properties. The amount of bundle warp or penetration of the catalyzed composition into the fibers is one important parameter which gives the carpet these excellent properties. The amount of bundle warp or penetration into the carpet fibers is controlled mainly by adjusting the time to reach the proper viscosity. If the time to reach a proper viscosity is too fast, then the penetration of the composition into the carpet fibers is greatly reduced. This reduction in penetration yields a carpet which lacks the desired tuft lock and pilling and fuzzing characteristics. The time to reach a proper viscosity is controlled through the use of the appropriate amount of catalyst in conjunction with the proper choice of polyols. For example, if fast reacting polyols are employed, then the catalyst amount must be adjusted to give the proper time-viscosity relationship for the reaction composition.

EXAMPLE 12

The following experiments were performed to determine the effect of varying times to reach 20,000 centipoise on penetration weight and the resultant tuft lock performance. The time to reach 20,000 centipoise was varied through the use of different catalyst levels. The following composition was used throughout these experiments employing the procedure of Example 1.

90 pbw of a reaction product of glycerine with propylene oxide and end-capped with ethylene oxide to the extent 2 moles of ethylene oxide per OH group, MW=3000, f=3
10 pbw diethylene glycol, MW=106, f=2
27.65 pbw alumina trihydrate
161.25 pbw calcium carbonate
47.5 pbw isocyanate prepolymer, a reaction product of an excess of toluene diisocyanate with the reaction product of glycerine with propylene oxide in a molar ratio of 3 moles of propylene oxide per mole of glycerine, said prepolymer having 30% by weight free NCO groups and an NCO equivalent weight of 140
varying pbw catalyst, a 33% solution of triethylenediamine in dipropylene glycol
filler/liquid reactants weight ratio=128.1/100
NCO:OH ratio in formation=1.20:1.

The properties of the resultant carpet samples together with the time to reach 20,000 centipoise are given in the following Table XI.

TABLE XI

| Sample | [33% solution of tri-ethylene diamine] pbw | Time To 20,000 Cp sec. | Coating Wt. oz/yd$^2$(g/m$^2$) | Penetration Wt. oz/yd$^2$/g/m$^2$ | Tuft Lock lbs(kg) | Curl cm. |
|---|---|---|---|---|---|---|
| A | 0.15 | 170 | 35.5(1203.80) | 20.0(678.19) | 18.9(8.57) | 2.4 |
| B | 0.33 | 120 | 35.6(1207.19) | 16.9(573.07) | 17.6(7.98) | 3.6 |
| C* | 0.60 | 60 | 37.1(1258.05) | 9.7(328.92) | 9.5(4.31) | 2.6 |
| D* | 1.00 | 51 | 34.2(1159.71) | 6.4(217.0) | 9.5(4.31) | 2.1 |

*Comparative - The tuft lock values are below 12 pounds because the penetration is too low to provide adequate bundle wrap. This is due to the very fast time involved in reaching 20,000 centipoise viscosity.

This table indicates that if the time to reach 20,000 is below about 70 seconds, then the penetration of the composition into the carpet fiber would be too low to provide the necessary bundle wrap for obtaining the necessary 12 pounds tuft lock.

EXAMPLE 13

The following experiment illustrates the use of a flame suppressing agent employing the procedure of Example 1 except that a woven carpet substrate manufactured by Bigelow Sanford, having a greige weight of 35 oz/yd$^2$, was employed. The following formulation was employed.

85 pbw polyoxypropylene glycol, MW=2000, f=2
15 pbw dipropylene glycol, MW=134, f=2
30 pbw alumina trihydrate
60 pbw vinylidene chloride-vinyl chloride copolymer containing 90% vinylidene chloride and 10% by weight vinyl chloride, a micronized suspension resin containing 70% by weight chlorine
60 pbw antimony oxide, KR grade manufactured by the Harshaw Chemical Company
60 pbw prepolymer employed in Example 1
0.2 pbw catalyst Fomrex UL-28
filler/liquid reactants weight ratio=93.75/100
NCO:OH ratio in formulation=1.25:1.

The carpet sample had a urethane coating weight of 30.8 oz/yd$^2$.

A carpet sample prepared as above was subjected to the verticle burn test as proscribed in flame specification for Airlines in Federal Aviation Regulation, Part 25, Section 25.853b (Airworthiness Standards). The sample had an average burn length of 2.62 with no after flame or after glow, which either meets or exceeds the above noted FAR. (NOTE: THE ABOVE DATA PERTAINING TO THE VERTICAL BURN TEST IS NOT INTENDED TO REFLECT THE HAZARDS PRESENTED BY THIS OR ANY OTHER MATERIAL UNDER ACTUAL FIRE CONDITIONS.)

For purposes of determining tuft lock and edge curl, the same formulation was coated onto the test carpeting employed in Example 1. This carpet sample had a urethane coating weight of 34.1 oz/yd$^2$. The tuft lock was determined to be 21.0 pounds. The carpet backed sample had an edge curl of 1.6 centimeters.

The following examples were made to illustrate the use of the inert gas frothing technique.

EXAMPLE 14

To a Hobart mixer equipped with a blade for whipping air into the mixture was charged 51.63 grams of a liquid polyoxypropylene glycol having a molecular weight of 1200 and a hydroxyl functionality of 2, 15 grams of dipropylene glycol having a molecular weight of 134 and a hydroxyl functionality of 2, 23.74 grams of alumina trihydrate, 138.48 grams of calcium carbonate, 60 grams of an isocyanate prepolymer employed in Example 1, and 0.25 grams of Dow Corning 197 silicone surfactant. The components were whipped at high speed for about 5 minutes. After whipping was completed, 0.13 grams of UL-28 catalyst was added and the resultant froth was mixed for an additional 30 seconds. The catalyzed froth having a density of about 56.72 lbs/ft$^3$ was doctored onto the back of a residential grade of carpet made of 2 ply nylon fibers weighing about 21.1 oz/yd$^2$ and tufted through a woven polypropylene primary backing at the rate of about 6.0 stitches per inch. The greige good is a cut shag characterized by having a pile height of about 0.750 inches and a greige weight of about 25.1 oz/yd$^2$. The sample containing the urethane backing was cured at 120° C. for 8 minutes.

The carpet sample had a urethane coating weight of about 19.6 oz/yd$^2$. The carpet had a tuft lock of about 12.6 pounds with a dry breaking strength in the warp direction of about 197 pounds (See FHA Um 44C). The carpet with the jute replacement system described above possesses all the necessary requirements for the residential carpet industry.

For purposes of determining the tuft lock and edge curl for the present invention, the system was coated in an unfrothed condition on the particular greige good employed in Example 1. This carpet sample had a urethane coating weight of about 33.3 oz/yd$^2$. The carpet had a tuft lock of about 26.5 pounds with an edge curl of about 2.8 centimeters.

EXAMPLE 15

To one tank of a machine designed to meter two streams to a Oakes frothing head was charged 305 pounds of a filled polyol mixture. The filled polyol mixture consisted of 85 pbw of a polypropylene glycol having a molecular weight of 2000 and a hydroxyl functionality of 2, 15 pbw of dipropylene glycol, 30 pbw alumina trihydrate, 175 pbw calcium carbonate and 0.125 pbw Union Carbide L-5720 silicone surfactant.

To the second tank of the machine was charged 50 pounds of an isocyanate prepolymer employed in Example 1.

Ingredients in the storage tanks were metered continuously at an NCO:OH ratio of about 1:20:1 to an Oakes frothing head where a metered amount of nitrogen was introduced to the stream just before it entered the Oakes head and frothed to density of about 35 lbs/ft$^3$. Approximately 0.2 pbw of UL-28 was metered into the froth and mixed with the use of Kenics static mixers.

The catalyzed froth was doctored onto the back of carpet described in Example 11. The sample containing the urethane froth was cured at 120° C. for 8 minutes.

The carpet sample had a urethane coating weight of about 19.91 oz/yd$^2$. The carpet had a tuft lock of about 10.6 pounds with a dry breaking strength of about 132 pounds (warp direction).

For purposes of determining the tuft lock and edge curl for the present invention, the system was coated in an unfrothed condition on the particular greige good employed in Example 1. The carpet had a urethane coating weight of about 35.0 oz/yd$^2$. The carpet had a tuft lock of about 26.0 pounds with an edge curl of about 2.0 centimeters.

We claim:

1. A polyurethane composition for providing a unitary backing for tufted or woven carpets which composition comprises the catalyzed reaction product of a polyurethane forming mixture comprising
   (A) a relatively high molecular weight polyether polyol having an average of from 2 to about 8 hydroxyl groups per molecule and an average hydroxyl equivalent weight of from about 500 to about 2200 or a mixture of such polyols;
   (B) a relatively low molecular weight polyol having an average of from about 2 to about 8 hydroxyl groups per molecule and an average equivalent weight of from about 31 to about 230 or a mixture of such polyols;
   (C) an organic polyisocyanate or polyisothiocyanate having an average of from about 2 to about 4 NCX (each X being independently O or S) groups per molecule or a mixture of such isocyanates or isothiocyanates; and
   (D) an inorganic filler component; wherein:
   (1) components (A) and (B) are present in quantities such that the ratio of the number of hydroxyl equivalents contributed by component (B) to the number of hydroxyl equivalents contributed by component (A) is from about 0.8:1 to about 5.5:1;
   (2) components (A), (B) and (C) are present in quantities so as to provide an NCX/OH ratio of from about 0.95/1 to about 1.5/1; with the proviso that the NCX:OH ratio is sufficient to provide a tuft lock value of at least about 12 pounds and the edge curl value is not greater than about 4.1 centimeters at the particular ratio at which components (A) and (B) are employed and the particular equivalent weights at which components (A) and (B) are employed;
   (3) component (D) is present in quantities of from about 50 parts to about 300 parts per 100 parts by weight of liquid reactants; and
   (4) the time required for the catalyzed, filled, unfrothed polyurethane forming mixture to reach a Brookfield viscosity of 20,000 centipoise is greater than about 70 seconds measured from the time the catalyst is added to a mixture of the other components, said catalyst being added when the temperature of the uncatalyzed mixture is about 93° F., ±1° F.

2. The composition of claim 1 wherein component (A) has an equivalent weight of from about 600 to about 2200 and an average of from about 2 to about 3 hydroxyl groups per molecule; component (B) has an equivalent weight of from about 31 to about 200; component (C) is an organic polyisocyanate; components (A) and (B) are present in quantities such that the ratio of the number of hydroxyl equivalents contributed by component (B) to the number of hydroxyl equivalents contributed by component (A) is from about 0.8:1 to about 4:1; components (A), (B) and (C) are present in quantities so as to provide an NCO/OH ratio of from about 1.1/1 to about 1.25/1; and component (D) is present in quantities of from about 60 to about 250 parts per 100 parts by weight of liquid reactants.

3. The composition of claim 2 wherein component (A) is a polyoxypropylene glycol; component (B) is propylene glycol, dipropylene glycol or a polyoxypropylene glycol; component (C) is a prepolymer prepared from an organic polyisocyanate.

4. The composition of claims 1, 2 or 3 wherein component (A) is a polyoxypropylene glycol having an average hydroxyl equivalent weight of about 600, about 1000 or about 2000.

5. The composition of claim 4 wherein component (A) is a polyoxypropylene glycol having an average hydroxyl equivalent weight of about 1000; component (B) is dipropylene glycol; component (C) is a prepolymer prepared from a mixture of a polyoxyethylene glycol having an equivalent weight of about 100 and an adduct of glycerine and propylene oxide having an OH equivalent weight of about 87 and an 80/20 mixture of 2,4-/2,6-toluene diisocyanate such that the prepolymer has an NCO equivalent weight of from about 150 to about 160; and component (D) is a mixture of alumina trihydrate and calcium carbonate.

6. The composition of claim 5 wherein one or more flame supressing agent(s) is employed.

7. The composition of claim 6 wherein a polymer or copolymer of vinyl chloride or vinylidene chloride or mixture thereof is employed.

8. The composition of claim 7 wherein a copolymer containing 10% vinyl chloride and 90% by weight vinylidene chloride is employed.

9. The composition of claim 4 wherein one or more flame supressing agent(s) is employed.

10. The composition of claim 9 wherein a polymer or copolymer of vinyl chloride or vinylidene chloride or mixture thereof is employed.

11. The composition of claim 10 wherein a copolymer containing 10% vinyl chloride and 90% by weight vinylidene chloride is employed.

12. The composition of claims 1, 2 or 3 wherein one or more flame supressing agent(s) is employed.

13. The composition of claim 12 wherein a polymer or copolymer of vinyl chloride or vinylidene chloride or mixture thereof is employed.

14. The composition of claim 13 wherein a copolymer containing 10% vinyl chloride and 90% by weight vinylidene chloride is employed.

15. A carpet comprising (I) a primary backing; (II) a yarn tufted or woven through said primary backing thereby creating a yarn bundle on the underside of the resultant tufted or woven textile article and (III) a polyurethane composition applied to the underside thereby encapsulating the yarn bundles and adhering the yarn bundles to the primary backing; said polyurethane composition comprising the catalyzed reaction product of a mixture comprising
   (A) a relatively high molecular weight polyether polyol having an average of from 2 to about 8 hydroxyl groups per molecule and an average hydroxyl equivalent weight of from about 500 to about 2200 or a mixture of such polyols;
   (B) a relatively low molecular weight polyol having an average of from about 2 to about 8 hydroxyl groups per molecule and an average equivalent weight of from about 31 to about 230 or a mixture of such polyols;

(C) an organic polyisocyanate or polyisothiocyanate having an average of from about 2 to about 4 NCX (each X being independently O or S) groups per molecule or a mixture of such isocyanates or isothiocyanates; and (D) an inorganic filler component; wherein:

(1) components (A) and (B) are present in quantities such that the ratio of the number of hydroxyl equivalents contributed by component (B) to the number of hydroxyl equivalents contributed by component (A) is from about 0.8:1 to about 5.5:1;

(2) components (A), (B) and (C) are present in quantities so as to provide an NCX/OH ratio of from about 0.95/1 to about 1.5/1; with the proviso that the NCX:OH ratio is sufficient to provide a tuft lock value of at least about 12 pounds and the edge curl value is not greater than about 4.1 centimeters at the particular ratio at which components (A) and (B) are employed and the particular equivalent weights at which components (A) and (B) are employed; and (B 3) component (D) is present in quantities of from about 50 parts to about 300 parts per 100 parts by weight of liquid reactants; and wherein (a) said carpet has a tuft lock of at least about 12 pounds (5.44 kg) and an edge curl of not greater than about 4.1 centimeters and (b) the time required for the catalyzed, filled, unfrothed polyurethane forming mixture to reach a Brookfield viscosity of 20,000 centipoise is greater than about 70 seconds measured from the time the catalyst is added to a mixture of the other components, said catalyst being added when the temperature of the uncatalyzed mixture is about 93° F., ±1° F.

16. The carpet of claim 15 wherein component (A) has an equivalent weight of from about 600 to about 2200 and an average of from about 2 to about 3 hydroxyl groups per molecule; component (B) has an equivalent weight of from about 31 to about 200; component (C) is an organic polyisocyanate; components (A) and (B) are present in quantities such that the ratio of the number of hydroxyl equivalents contributed by component (B) to the number of hydroxyl equivalents contributed by component (A) is from about 0.8:1 to about 4:1; components (A), (B) and (C) are present in quantities so as to provide an NCO to OH ratio of from about 1.1:1 to about 1.25:1; and component (C) is present in quantities of from about 60 to about 250 parts per 100 parts by weight of liquid reactants.

17. The carpet of claim 16 wherein component (A) is a polyoxypropylene glycol; component (B) is propylene glycol, dipropylene glycol or a polyoxypropylene glycol; component (C) is a prepolymer prepared from an organic polyisocyanate.

18. The carpet of claims 15, 16 or 17 wherein component (A) is a polyoxypropylene glycol having an average hydroxyl equivalent weight of about 600, about 1000 or about 2000.

19. The carpet of claim 18 wherein component (A) is a polyoxypropylene glycol having an average hydroxyl equivalent weight of about 1000; component (B) is dipropylene glycol; component (C) is a prepolymer prepared from a mixture of a polyoxyethylene glycol having an equivalent weight of about 100 and an adduct of glycerine and propylene oxide having an OH equivalent weight of about 87 and an 80/20 mixture of 2,4-2,6-toluene diisocyanate such that the prepolymer has an NCO equivalent weight of from about 150 to about 160; and component (D) is a mixture of alumina trihydrate and calcium carbonate.

20. The carpet of claim 19 wherein the polyurethane composition is a foam and the tuft lock and edge curl values are determined from a carpet sample wherein the polyurethane composition is in an unfoamed condition.

21. The carpet of claim 20 wherein one or more flame supressing agent(s) is employed.

22. The carpet of claim 21 wherein a polymer or copolymer of vinyl chloride or vinylidene chloride or mixture thereof is employed.

23. The carpet of claim 22 wherein a copolymer containing 10% vinyl chloride and 90% by weight vinylidene chloride is employed.

24. The carpet of claim 19 wherein one or more flame supressing agent(s) is employed.

25. The carpet of claim 24 wherein a polymer or copolymer of vinyl chloride or vinylidene chloride or mixture thereof is employed.

26. The carpet of claim 25 wherein a copolymer containing 10% vinyl chloride and 90% by weight vinylidene chloride is employed.

27. The carpet of claim 18 wherein the polyurethane composition is a foam and the tuft lock and edge curl values are determined from a carpet sample wherein the polyurethane composition is in an unfoamed condition.

28. The carpet of claim 27 wherein one or more flame supressing agent(s) is employed.

29. The carpet of claim 28 wherein a polymer or copolymer or vinyl chloride or vinylidene chloride or mixture thereof is employed.

30. The carpet of claim 29 wherein a copolymer containing 10% vinyl chloride and 90% by weight vinylidene chloride is employed.

31. The carpet of claim 18 wherein one or more flame supressing agent(s) is employed.

32. The carpet of claim 31 wherein a polymer or copolymer of vinyl chloride or vinylidene chloride or mixture thereof is employed.

33. The carpet of claim 32 wherein a copolymer containing 10% vinyl chloride and 90% by weight vinylidene chloride is employed.

34. The carpet of claims 15, 16, or 17 wherein the polyurethane composition is a foam and the tuft lock and edge curl values are determined from a carpet sample wherein the polyurethane composition is in an unfoamed condition.

35. The carpet of claim 34 wherein one or more flame supressing agent(s) is employed.

36. The carpet of claim 35 wherein a polymer or copolymer of vinyl chloride or vinylidene chloride or mixture thereof is employed.

37. The carpet of claim 36 wherein a copolymer containing 10% vinyl chloride and 90% by weight vinylidene chloride is employed.

38. The carpet of claims 15, 16, or 17 wherein one or more flame supressing agent(s) is employed.

39. The carpet of claim 38 wherein a polymer or copolymer of vinyl chloride or vinylidene chloride or mixture thereof is employed.

40. The carpet of claim 39 wherein a copolymer containing 10% vinyl chloride and 90% by weight vinylidene chloride is employed.

* * * * *

UNITED STATES PATENT AND TRADEMARK OFFICE
CERTIFICATE OF CORRECTION

PATENT NO. : 4,296,159

DATED : October 20, 1981

INVENTOR(S) : Randall C. Jenkines, et al

It is certified that error appears in the above—identified patent and that said Letters Patent is hereby corrected as shown below:

Col. 1, line 35; change "and" to --or--.
Col. 6, line 30; insert --value-- between "lock" and "above".
Col. 7, line 16; change "either" to --eight--.
Col. 7, line 53; change "functonality" to --functionality--.
Col. 7, line 57; change "availabe" to --available--.
Col. 9, line 21; change "Formez" to --Fomrez--.
Col. 13, line 66; change "formation" to --formulation--.
Col. 14, line 10 of Table VI, under heading "Tuft Lock lbs(kg)"; change "19.8(8.89)" to --19.8(8.99)--.
Col. 18, line 20; change "warp" to --wrap--.
Col. 18, line 23; change "warp" to --wrap--.
Col. 18, line 26; change "warp" to --wrap--.
Col. 18, line 38; change "reaction" to --reacting--.
Col. 18, line 65; change "formation" to --formulation--.
Col. 19, line 37, change "Fomrex" to --Fomrez--.
Col. 23, line 24; change "(B3)" to --(3)--.
Col. 24, line 33, change "or" first occurrence to --of--.

Signed and Sealed this

Twentieth Day of April 1982

[SEAL]

Attest:

GERALD J. MOSSINGHOFF

Attesting Officer     Commissioner of Patents and Trademarks